(12) United States Patent
Szwilski et al.

(10) Patent No.: US 8,180,590 B2
(45) Date of Patent: May 15, 2012

(54) RAILROAD SURVEYING AND MONITORING SYSTEM

(75) Inventors: Anthony B. Szwilski, Lexington, KY (US); Richard D. Begley, Huntington, WV (US)

(73) Assignee: Marshall University Research Corporation, Huntington, WV (US)

( * ) Notice: Subject to any disclaimer, the term of this patent is extended or adjusted under 35 U.S.C. 154(b) by 763 days.

(21) Appl. No.: 12/312,937

(22) PCT Filed: Oct. 6, 2004

(86) PCT No.: PCT/US2004/033262
§ 371 (c)(1),
(2), (4) Date: Jun. 1, 2009

(87) PCT Pub. No.: WO2005/036199
PCT Pub. Date: Apr. 21, 2005

(65) Prior Publication Data
US 2010/0026551 A1 Feb. 4, 2010

Related U.S. Application Data

(60) Provisional application No. 60/509,213, filed on Oct. 6, 2003, provisional application No. 60/509,212, filed on Oct. 6, 2003.

(51) Int. Cl.
*G01C 22/00* (2006.01)
(52) U.S. Cl. .......... 702/150; 702/94
(58) Field of Classification Search .......... 702/5, 57, 702/81, 94, 95, 150, 152, 153, 159, 167; 701/207, 208; 342/357.06, 357.13
See application file for complete search history.

(56) References Cited

U.S. PATENT DOCUMENTS

| 5,214,757 | A | * | 5/1993 | Mauney et al. | 715/751 |
|---|---|---|---|---|---|
| 5,379,045 | A | * | 1/1995 | Gilbert et al. | 342/357.36 |
| 5,493,499 | A | * | 2/1996 | Theurer et al. | 701/207 |
| 5,721,685 | A | * | 2/1998 | Holland et al. | 701/207 |
| 6,377,872 | B1 | * | 4/2002 | Struckman | 700/258 |
| 6,462,696 | B1 | * | 10/2002 | Gorman | 342/22 |
| 6,570,497 | B2 | * | 5/2003 | Puckette et al. | 340/539.1 |
| 6,604,421 | B1 | * | 8/2003 | Li | 73/636 |
| 2002/0010546 | A1 | * | 1/2002 | Roberts | 702/2 |
| 2002/0169558 | A1 | * | 11/2002 | Smith et al. | 702/5 |
| 2002/0198632 | A1 | * | 12/2002 | Breed et al. | 701/1 |

OTHER PUBLICATIONS

Olhoeft et al, "Ground penetration radar evaluation of railway track substructure conditions", Proceedings of SPIEE—The International Society for Optical Engineering, vol. 4758, 48-53, 2002.*

(Continued)

*Primary Examiner* — Jeffrey R West
(74) *Attorney, Agent, or Firm* — Stites & Harbison, PLLC; David W. Nagle, Jr.

(57) ABSTRACT

A Railroad Surveying and Monitoring System configured on a mobile platform for surveying, monitoring, and analyzing rail position and superstructure and terrain substructure of railroad tracks (20*a,b*) or other structures. The system employs two or more High Accuracy Differential Global Positioning System devices (110,112), ground penetrating radar devices (116), terrain conductivity instruments (118), optical cameras (124), and data receivers and processors (126), which in turn process, display, and store the data in a usable database. Precise coordinate data generated from a High Accuracy Global Positioning System provides both location data for subsurface sensors and surface sensors and rail position coordinates to monitor track displacements during track inspection in real time.

24 Claims, 13 Drawing Sheets

OTHER PUBLICATIONS

El-Sheimy, "Report on Kinematic and Integrated Positioning Systems," TS5.1.5 Activities: Yesterday and Tomorrow, International Congress, Washington, D.C., Apr. 2002.

Wildi et al., "A Multisensor Platform for Kinematic Track Surveying, International workshop on Mobile Mapping Technology," Bangkok, Apr. 1999.

Litchberger, B., Electronically Assisted Surveying on Plain Track and Switches with GPS Link, Hestra-Verlag, Darmstadt, Germany, 2001.

Wenty, "Electronic track geometry surveying and timely spot maintenance Two key element to fully exploit heavy haul track," Plasser & Theurer, Vienna, Austria.

Zywiel et al., "Innovative Measuring System Unveiled," International Railway Journal, Sep. 2001.

Olhoeft et al., "Ground Penetrating Radar Evaluation of Railway Track Substructure Conditions," Proceedings of SPIEE—The International Society of Optical Engineering, 2002, vol. 4758, pp. 48-53.

Hugenschmidt, J., "Railway track inspection using GPR," Journal of Applied Geophysics, 43, 2000, pp. 147-155.

Olhoeft, G., "Automatic Processing and Modeling of GRP Data for Pavement Thickness and Properties," SPIE Proceedings vol. 4084, Eighth International Conference on Ground Penetrating Radar, Apr. 2000, pp. 188-193.

Munsen, "Rail Research Center and AAR Affiliates Laboratory," vol. 6, No. 2, 2001.

El-Sheimy, N., "Mobile Multi-Sensor Systems: Final Report" (1995-1999), International Association of Geodesy, IAG Special Commission 4, Jul. 1999.

* cited by examiner

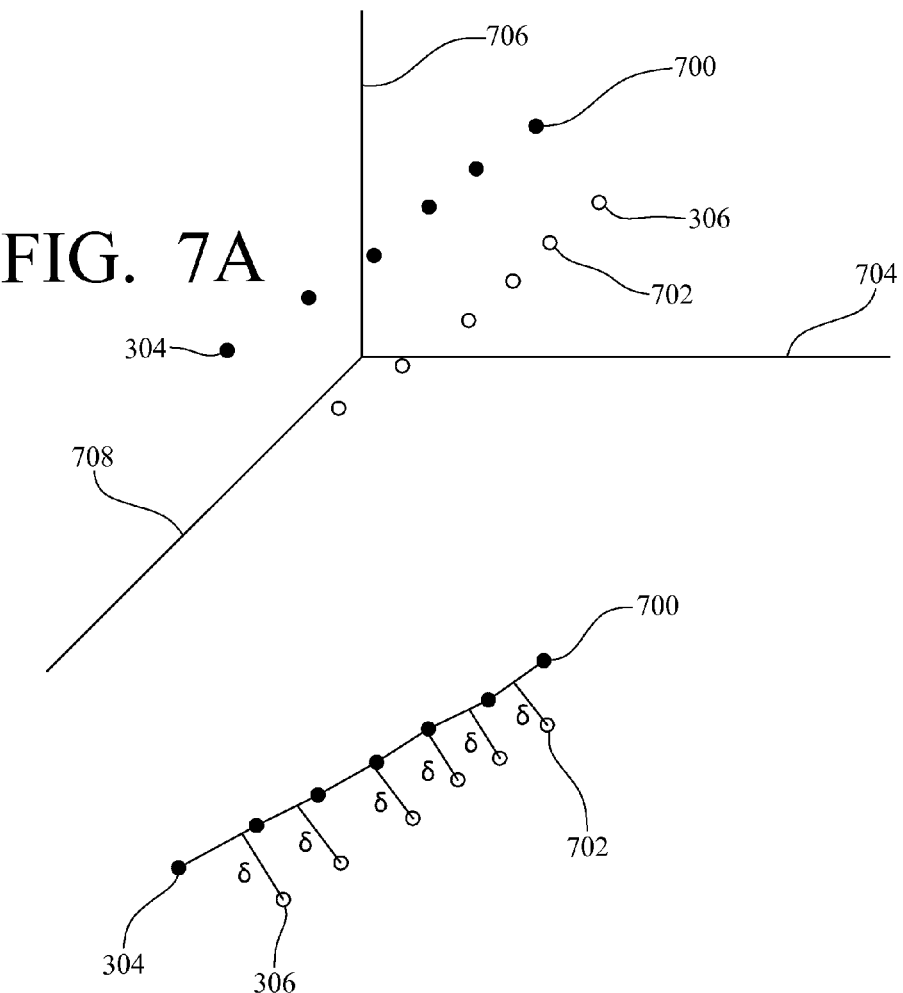
FIG. 7A
FIG. 7B
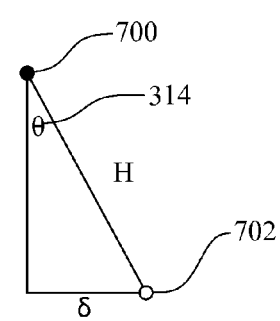
FIG. 7C

| Speed of Hy-Rail GPS Survey | Data Repeatability (Accuracy) cm | New Survey Point to Baseline Distance | | New Survey Line to Baseline Distance | |
|---|---|---|---|---|---|
| | | Mean cm | From Initial 139.33 cm | Mean cm | From Initial 139.33 cm |
| 5 mph | 1.37 (0.54 ins) | 139.15 | 0.18 cm (0.39 ins) | 139.02 | 0.31 cm (0.12 ins) |
| 10 mph | 0.77 (0.38 ins) | 139.27 | 0.06 cm (0.02 ins) | 139.10 | 0.23 cm (0.09 ins) |
| 15 mph | 1.35 (0.53 ins) | 139.06 | 0.27 cm (0.11 ins) | 138.83 | 0.50 cm (0.20 ins) |
| Average | 1.16 (0.46 ins) | | 0.7 cm (0.07 ins) | | 0.35 cm (0.14 ins) |

| Speed of Hy-Rail GPS Survey | Data Repeatability (Accuracy) cm |
|---|---|
| 5 mph | 1.93 cm (0.76 ins) |
| 10 mph | 2.42 cm (0.95 ins) |
| 15 mph | 2.19 cm (0.86 ins) |
| Average | 2.18 cm (0.89 ins) |

RAILROAD SURVEYING AND MONITORING SYSTEM

CROSS-REFERENCE TO RELATED APPLICATIONS

This application claims the benefit of U.S. Provisional Application No. 60/509,212 filed Oct. 6, 2003, and U.S. Provisional Application No. 60/509,213 filed Oct. 6, 2003.

STATEMENT REGARDING FEDERALLY SPONSORED RESEARCH OR DEVELOPMENT

The United States government has a paid-up license in this invention and the right in limited circumstances to require the patent owner to license others on reasonable terms as provided for by the terms of contract and regulations of the FRA Agency Award #DTFR53-03-G-00014, DTFR53-02-G-00020, DTFR53-01-G-00307, and DTFR53-00-G-60024.

BACKGROUND OF THE INVENTION

1. Field of Invention

This invention pertains to a mobile railroad track surveying and monitoring apparatus and method, and more particularly, to a system employing High Accuracy Differential Global Positioning System receivers linkable with other non-invasive sensors for rail track superstructure and substructure surveying and monitoring. The invention is capable of modeling rail track movement, rail track vectors, rail track alignment, and subsurface conditions. The apparatus includes a mobile platform and surveying components situated for measuring accurate position data for rail alignment, rail surveying, and displacement trajectories of rail, as well as for collecting subsurface condition data. Means are additionally provided to correlate the position coordinate and subsurface condition data, display such data, record such data, and compare and model such data to previously established data sets.

2. Related Art

In the railroad industry, the precise measurement of the rail dimensional relationships, including horizontal and vertical coordinates, distances, elevations, directions, angles, and curves is especially important for boundary determinations, construction layout, surveys, and mapmaking.

Railroad tracks generally comprise a set of parallel rails upon which railroad cars or other suitably equipped vehicles run. Usually, the track consists of steel rails, secured on crossties, or "ties", so as to keep the rails at the correct distance apart (the gauge) and capable of supporting the weight of trains. As is also understood, monorails comprise a single rail. In any event, the rails can move as a result of surface subsidence, as is common along river banks. Buckling of rails caused by temperature influences also causes changes in the horizontal and vertical track alignments. These anomalies must be identified as part of routine track maintenance. One method for locating such anomalies is to compare an initial track data set with a subsequent track data set. Differences between the data sets indicate anomalies that can then be more thoroughly investigated.

Usually, an initial baseline track data set is acquired by measuring accurate position data of rail alignment using precise surveying methods. After a time, subsequent position measurements may then be collected along the same track length. The subsequent position measurements may then be compared with the baseline data. Specifically, the corresponding vertical and horizontal coordinates from each data set are compared. This comparison of data sets collected from the same stretch of track yields information regarding rail movement.

Usually, conventional surveying techniques are employed to plot rail alignment. However, conventional surveying practices are labor intensive and produce mixed results, especially when used in areas of significant ground movement. Because such conventional surveying systems require position on stable ground, any ground movement then results in the movement of the surveying monuments as well as the rails, thereby resulting in inaccurate surveying.

Conceptually, Mobile Multi-Sensor Systems (MMS) can accurately inventory geometric data along transportation routes such as roads, rivers and railways as described in the publication "El-Sheimy, N., Mobile Multi-Sensor Systems: Final Report" (1995-1999), International Association of Geodesy, IAG Special Commission 4, July 1999. Mapping systems acquiring positional coordinate data by means of a satellite receiver are well known in the art. As discussed, real-time applications possible in principle include the integration of digital imaging sensor results and precise navigation and surveying data. Equally well known are the limitations and poor accuracy of such data where there is loss of signal reception and inadequate sensor selection or configuration. Integral to implementation of such systems, but not described in the art, is a carrier vehicle, or mobile platform, suitable for accurate, precise, and operational flexibility equipped with such precision navigation and imaging sensors configured for real-time geo-referencing applications.

Similarly, integrated navigation technologies, including Global Positioning Systems (GPS) and Inertial Navigation Systems (INS), are discussed in El-Sheimy, N., "Report on Kinematic and Integrated Positioning Systems," TS5.1 5 Activities: Yesterday and Tomorrow, International Congress, Washington, April 2002. However, the art fails to address a mobile platform suitable for accurate, precise, and operationally flexibly equipped precision navigation and imaging sensors configured for real-time geo-referencing applications.

Comparably, a modular lightweight platform for track surveying is discussed in Wildi, T., Glause, R., "A Multisensor Platform for Kinematic Track Surveying, International Workshop on Mobile Mapping Technology", Bangkok, April 1999. The art fails to address platform negotiations through switches, vibrations, side-to-side movement of platform, location of navigation and other sensors, antenna orientation, reduction of data dropouts, alignment of the antenna and sensors, use of a survey controller for elevation offset, vehicle wandering and vehicle speed. The art fails to identify a platform apparatus minimizing or accounting for these sources of error necessary for precision navigation and surveying in real-time applications. It fails to address a mobile platform, suitable for accurate and precise surveying as well as operational flexibility.

Additionally, an electronic track surveying car with satellite (EM-SAT) used for mechanized surveying is described in Litchberger, B. "Electronically Assisted Surveying on Plain Track and Switches with GPS Link," 2001. EM-SAT employs laser chord technology in combination with a GPS receiver. The combination of relative laser measurement and GPS coordinates, used in EM-SAT, is also addressed in "Electronic track geometry surveying and timely spot maintenance Two key element to fully exploit heavy haul track" by Ing. Rainer Wenty. This technology, however, is dependent upon lasers in combination with GPS systems, and fails to address platform movement, vibrations, location and selection of navigation and other sensors, antenna placement for reduction of data dropouts, using a survey controller for elevation offset, vehicle wandering and vehicle speed. It fails to identify a platform apparatus minimizing or accounting for these sources of errors necessary for precision navigation and surveying in real time applications. It fails to address a mobile platform, suitable for accurate and precise surveying as well as operational flexibility.

Jan Zywiel et al. discuss in "Innovative Measuring System Unveiled," September 2001, a modular blend of GPS systems and inertial sensors combined with optical gauge measurements to accurately measure track geometry and identify its geographic location. However, the art fails to disclose a mobile platform, suitable for accurate, precise, and operational flexibility equipped with precision surveying and imaging sensors configured for real-time geo-referencing applications.

"Ground Penetrating Radar Evaluation of Railway Track Substructure Conditions" by G. R. Olhoeft et al. discusses use of a sport utility vehicle (SUV) modified for hy-rail use to which is mounted ground penetrating radar (GPR) to image track. Specifically, antennas were mounted 19 to 22 inches above railroad ties in different electric field configurations. However, the technology is limited to GPR data and orientation of radar fields. Similarly, J. Huggenschmidt discusses GPR inspections in "Railway track inspection using GPR" which is limited in application to GPR. It neither addresses platform specifications nor sensor orientation and configuration for GPS based surveying. Additionally, G. Olhoeft describes GPR applications in "Automatic Processing and Modeling of GRP Data for Pavement Thickness and Properties." This article, like the other GPR specific articles, is mostly inapplicable to GPS system orientation, and fails to address platform movement, vibrations, location and selection of navigation and other sensors, antenna placement for reduction of data dropouts, use of a survey controller for elevation offset, vehicle wandering and vehicle speed. The art fails to identify a platform apparatus minimizing or accounting for these sources of error necessary for precision navigation and surveying in real-time applications. It fails to address a mobile platform, suitable for accurate and precise surveying as well as operational flexibility.

Munsen has described developing GPS algorithms to precisely monitor rail position, then combine track survey and rail temperature data to infer contained rail stress to predict types of rail buckling as discussed in the "Rail Research Center and AAR Affiliates Laboratory" Vol. 6, No. 2, 2001. However, platform design, sensor configuration and orientation, and real-time applications are not addressed. Again, like the other prior art discussed herein, it fails to address platform negotiations through switches, vibrations, side-to-side movement of platform, location of navigation and other sensors, antenna orientation, reduction of data dropouts, alignment of the antenna and sensors, use of a survey controller for elevation offset, vehicle wandering and vehicle speed. The prior art universally fails to identify a platform apparatus minimizing or accounting for these sources of error which is necessary for precision navigation and surveying in real-time applications.

SUMMARY OF THE INVENTION

This invention addresses and solves the problems of the prior art systems by combining High Accuracy Differential Global Positioning System (HADGPS) devices, ground penetrating radar devices, terrain conductivity instruments, optical cameras, and data receivers and processors, which in turn process, display, and store the data in a usable database and provides precise position coordinates for correlation with the subsurface sensor data. The data is used for rail displacement monitoring and rail surveying purposes wherein the present invention provides a simple, but accurate, precision surveying system that enables a user to identify superstructure and substructure anomalies related to the track rails.

The invention conveniently utilizes conventional commercially available HADGPS systems. In particular, the invention preferably utilizes two HADGPS' coupled to subsurface sensors and data receivers, each of which is easily attached to a mobile platform capable of traveling one or more of rails a track at virtually any permitted speed, while collecting in real-time precise coordinate data and subsurface data. Thus, the invention is able to generate accurate position data of the track rails and substructure in real-time at varying speeds, and accordingly in varying densities of data points, making it useful for a multitude of surveying and modeling applications.

A development of this system is that the typical Global Positioning System (GPS) data generated by a HADGPS receiver such as time, position, velocity, course-over-ground and speed-over-ground is processed such that the system generates very accurate rail position not just accurate GPS receiver position. From this accurate rail position data, the system generates data about rail track alignment, rail track displacement vectors, and rail anomalies, and is further able to identify subsurface conditions and anomalies by incorporating sensors to assess subsurface characteristics. The invention includes Ground Penetrating Radar (GPR) devices, terrain conductivity devices, and optical camera devices from which sensor data is generated and tagged to correlate with the respective coordinate data points of the rail generated by the HADGPS.

In this invention, there is also a unique application of two GPS receivers. Utilizing two receivers yields advantages. The advantages include consistency of data, redundancy, and a simple determination of track inclination and rail position correction. In order to achieve these advantages, the invention specifically orients two GPS receivers so that they accurately determine the rail position. Preferably, the two GPS receivers are each vertically aligned over one rail, with the first GPS receiver positioned higher than the second GPS receiver. Importantly, the use of multiple rovers does not interfere with HADGPS signal reception, and because real-time surveying performance is influenced by several site-related factors, significantly including a blocked horizon, a two rover system reduces GPS data-drop errors. Additionally, by orienting two GPS receivers in this way, the invention comprises means to measure track inclination, also sometimes referred to in the art as super-elevation, which is the cross level angle of track.

Because vibrations and movement of the GPS receivers or platform can impact coordinate accuracy, it is important that there be very little discernable vibration causing movement. Thus, an aspect and advantage of the invention is its use of double-flanged wheels which are mounted directly and snugly over a rail, such that it "rides" the rail. This negates the 'hunting' effect, and thus side-ways movement of the platform.

Another advantage of the system is its ability to be easily adapted to a number of mobile platforms such as track mounted vehicles like Sport Utility Vehicle (SUV) hy-rails, rail bikes or train engine/locomotives. This makes the present system flexible.

Aspects of the invention include its data flexibility and the fact that generated positional data is easily configured to be sent through a conventional TCP/IP network to a central computer, stored in a geographical information systems (GIS) database, displayed or otherwise provided to a user by appropriate means. This is achieved by the combination of using conventional HADGPS systems and standard NMEA data streams, wherein NMEA refers to the interface specifications between electronic equipment developed by the National Marine Electronics Association.

However, chief among the advantages of this invention is that is allows for rapid and accurate rail track modeling. Rail coordinate data generated by this invention is higher density (more points per foot) and collected faster than traditional surveying. Additionally, high position coordinate accuracies can be achieved by this system including a horizontal coordinate component of accuracy less than 1.5 cm and a vertical coordinate component of less than 2.5 cm. Further, the precise position coordinates are correlated with other sensor data including non-invasive subsurface technology such as ground penetrating radar (GPR), terrain conductivity data sensors, and optical cameras; all of which, can be easily displayed and configured into a usable database.

Equally important is that the coordinate data and other sensor data is generated and displayed in real time with this system or is stored for post-processing applications. Additionally, rail displacement data processed through the track modeling software yields even more accuracy; specifically, a horizontal component of less than 1 cm and a vertical component of less than 2 cm.

As discussed, another advantage of the system is that for real-time kinematic applications, it is inherent that the platform apparatus be capable of traveling at normal velocities over rail track while maintaining its accuracy. This system travels at normal velocities, limited only by the permitted speeds or user application, meanwhile comprising a means for collecting and processing the coordinates and sensor data. In fact, the system provides average accuracies of 1.2 cm (0.47 ins) horizontal and 2.2 cm (0.87 ins) vertical for platform velocities of 5, 10 and 15 mph. Although the density of data collection decreases with increase in speed, the vertical and horizontal component accuracies remain similar.

Another feature of the invention is the display of the geometric data in a real time kinetic format suitable for those engaged in rail alignment and maintenance operations and that it provides a relatively inexpensive monitoring system for railway track superstructure and substructure monitoring. Because this invention makes it possible to measure simultaneously a plurality of track parameters, such as horizontal and vertical coordinates of a rail, rail track alignment, rail track displacement vectors, and subsurface conditions, while moving at normal velocities, and to perform real-time data collecting processing, the present invention constitutes a considerable saving in time in track survey operations while, at the same time, increasing the accuracy thereof.

Presently, there are no other technologies that can compete to provide track rail location accuracies and sub-surface characteristics economically.

The above and other objects, features and advantages of the present invention and the manner of realizing them will become more apparent, and the invention itself will best be understood from a study of the following description and appended claims with reference to the attached drawings showing preferred embodiments of the invention.

BRIEF DESCRIPTION OF THE DRAWINGS

The present invention is described with reference to the accompany drawings. In the drawings, like reference numbers indicate identical or functionally similar elements. Additionally, the left-most digit(s) of a reference number identifies the drawing in which the reference number first appears.

FIG. 7a shows, in representative form, on a coordinate system, GPS data points from GPS receivers.

FIG. 7b shows, in representative form, a plan view of connected data points from non-synchronized GPS streams from two GPS receivers.

FIG. 7c shows basic trigonometry relationship of data points from a single rover to data points of a second rover.

FIG. 15 is a table representing horizontal component accuracy of GPS data.

FIG. 16 is a table representing vertical component accuracy of GPS data.

DETAILED DESCRIPTION OF THE PREFERRED EMBODIMENTS

Figure 1:
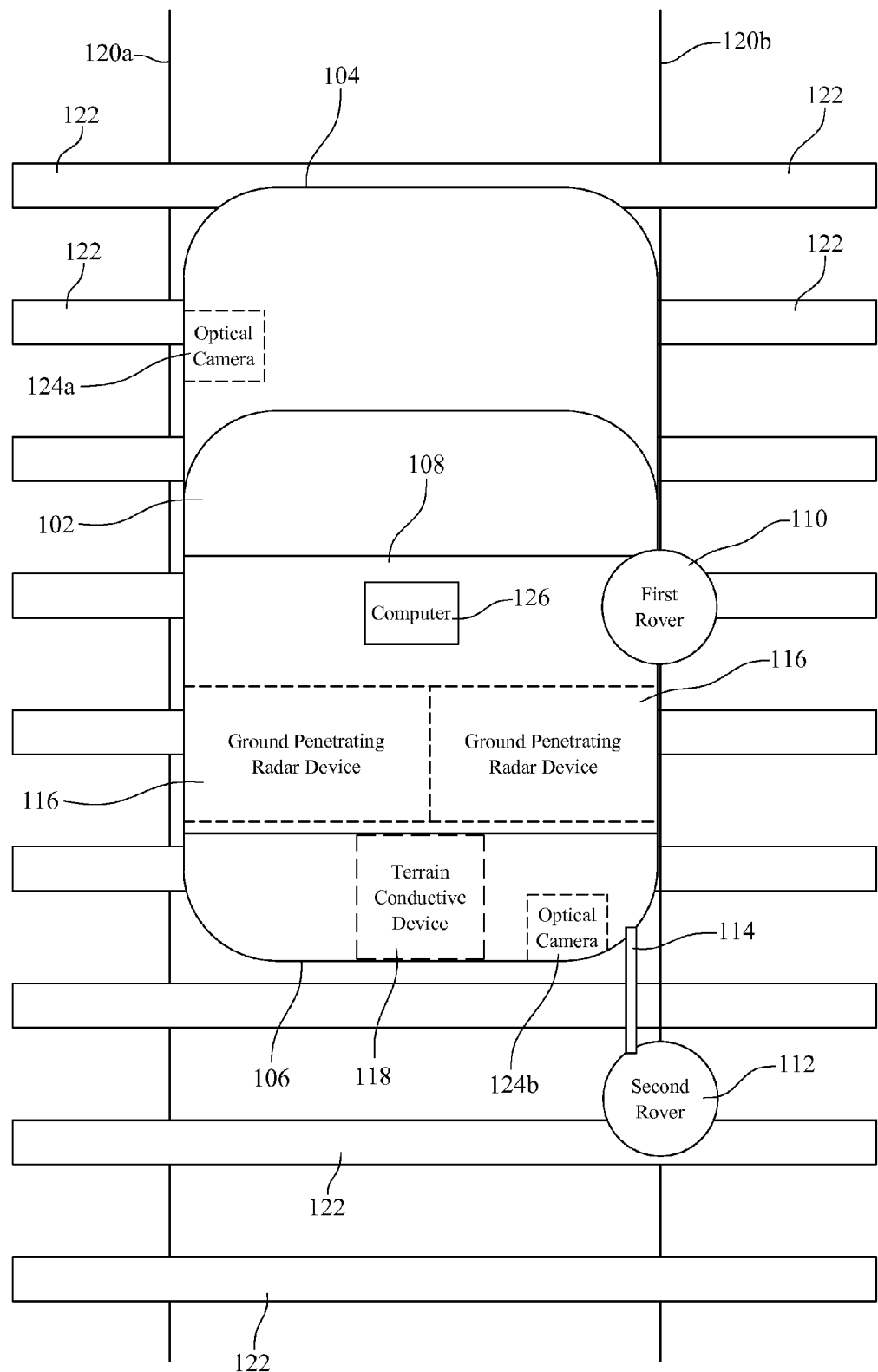
FIG. 1 shows a top view, represented in simplified form, of one exemplary embodiment of a mobile platform on a rail, comprising GPS receivers, and sensors attached to said platform used for rail track surveying, modeling, and inspection.

Preferred embodiments of the present invention herein described include an apparatus and method for multi-sensor railroad surveying and monitoring configured on a mobile platform. In one preferred embodiment as depicted in FIG. 1, is a mobile platform 102 having a roof rack 108. The front 104 and the rear 106 of the platform 102 are identified for convenience. A first rover 110 and a second rover 112 are attached to the platform 102 and in communication with a computer 126. In the preferred embodiment the computer 126 is attached to the mobile platform 102. The first rover 110 and the second rover 112 are positioned and aligned over the same track rail, e.g. rail 120b. For convenience purposes only, the present invention is described as surveying rail 120b. It would be readily apparent to one skilled in the art that the present invention can be applied to any rail, such as rail 120a. Also, the present invention is described in terms of a first and second rover 110, 112 for convenience purpose only. The present invention can be designed, implemented and operated using two or more rovers 110,112.

For the purposes herein, a rover shall mean a roving High Accuracy Differential Global Positioning System (HADGPS) receiver capable of making position measurements and communicating with a computer 126 through conventional means. It is well known in the art that the basic Global Positioning System (GPS) is a commercially available worldwide navigation system. GPS uses satellite signals to calculate positions accurate to a matter of meters. With alternative embodiments of GPS such as HADGPS, measurements are accurate within centimeters. HADGPS involves GPS satellites and the cooperation of a base station receiver and another receiver roaming, or roving, around making position measurements. Therefore, the first rover 110 and the second rover 112 are roving GPS receivers making position measurements. It would be evident to one skilled in the art, that a rover would therefore comprise an antenna, an antenna phase center (the measuring point of the antenna), a power source, UHF radios, means for receiving GPS satellite data and error correction data from GPS base stations (collectively "raw data" or "HADGPS raw data"), and means for communicating the HADGPS raw data to a computer 126, all of which may be, in a single compact device. In the preferred embodiment, the first rover 110 and the second rover 112 are commercially available HADGPS compatible rovers manufactured by Trimble. As would be evident to one skilled in the art, the use of a computer 126 herein includes any data processing device, preferably a laptop, capable of processing, storing and displaying HADGPS data generated by the first and second rovers 110, 112. In an alternative embodiment, HADGPS raw data 202 also is sent through a wireless network by standard communication channels to a central or network computer.

FIG. 1 further displays rail ties 122 that help maintain the gauge 500 (distance) between the rails 120a,b. The first rover 110 is preferably attached to the roof rack 108 close to the rear of the platform 102. The placement of the first rover 110 on top of the platform 102, or a roof rack 108, enables it to have a clear line of sight for GPS satellite communications. The second rover 112 is preferably extended away from the platform 102 by means of an extended arm 114. The use of an extended arm 114 permits the second rover 112 to be positioned closer to the rail 120b. As shown in FIG. 1, the extended arm 114 extends behind the platform 102, but this is for convenience purpose only. It would be readily apparent to one of ordinary skill in the relevant art to extend the extended arm 114 in front of, to the side of, or below the platform 102.

Figure 3:
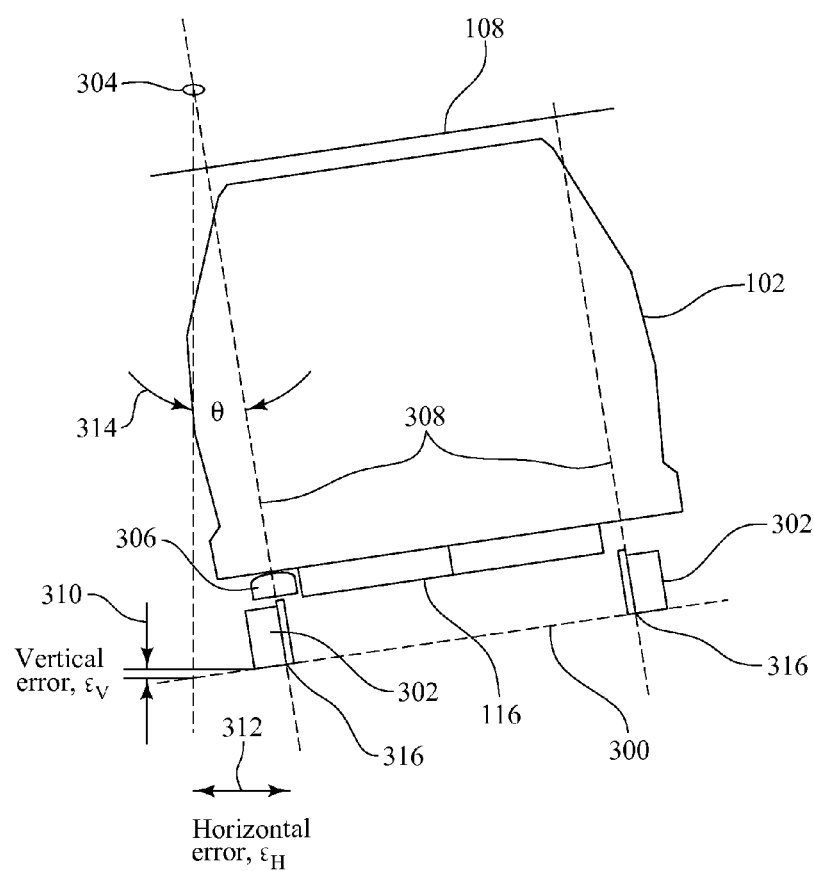
FIG. 3 shows a cross-section view of vertical error and horizontal error due to track inclination.

Referring to FIG. 3, in the preferred embodiment, the antenna phase center 306 of the second rover 112 is positioned at a second predefined distance from a side edge 316 of the rail 120b. Additionally, the antenna phase center 304 of the first rover 110 is positioned at a first predefined distance from a side edge 316 of the rail 120b. In this embodiment, the distance between the antenna phase center 304 of the first rover 110 to the side edge 316 of the rail 120b is greater than the distance between the antenna phase center 306 of the second rover 112 to the side edge 316 of the rail 120b.

In the preferred embodiment, the antenna phase center 306 of the second rover 112 is vertically aligned above the side edge 316 of the rail 120b and is no more than 20 inches above the head 802 of the rail 120b. Also in the preferred embodiment, the antenna phase center 304 of the first rover 110 is vertically aligned above the side edge 316 of the rail 120b and is approximately six to eight feet above the head 802 of the rail 120b. It would be evident to one skilled in the art that reference to the side edge 316 of the rail 120b is for purposes of convenience and that alignment of the antenna phase centers 304, 306 of the first and second rovers 110, 112 could also be over the outside edge of the rail 120b.

Additionally depicted in FIG. 1 are sensors for Ground Penetrating Radar (GPR) devices 116, terrain conductivity device 118, and optical cameras 124a,b. These comprise non-invasive sensor devices. FIG. 1 depicts a mobile platform 102 having two GPR devices 116 one positioned on each side of the platform 102, one terrain conductivity device 118, and two optical cameras 124a,b.

In the preferred embodiment, the GPR devices 116 are 500 MHZ GPR devices, utilizing a GPR sensor component, manufactured by Mala Geoscience AB (MGS), that has been configured to correlate to and be tagged with corrected coordinate position data 212 generated from the HADGPS position data 202 utilizing a GPS source code. Inherent in a GPR device is that it sends and receives non-invasively penetrating radar signals or transmissions. The system produces GPR images and coordinates with the corrected coordinate position data 212 in real-time, thereby producing ground penetrating data. Additionally, the terrain conductivity device 118 preferably utilized is the EM38 and/or EM31 manufactured by Geonics.

The two GPR devices 116 as well as the terrain conductivity device 118 are located on the underside of the mobile platform 102 such that they are positioned close to the underlying ground. Such positioning minimizes the distance between the sensor devices 116, 118 and the underlying ground to be surveyed, and also eliminates structural interference from the mobile platform 102 between the sensor devices 116, 118 and the underlying ground. The sensor devices 116, 118 may, however, be placed at other locations on the mobile platform 102. Alternatively, the Ground Penetrating Radar (GPR) device 116, terrain conductivity devices 118, and optical cameras 124 may be placed on a separate mobile platform (not shown) from a platform 102 comprising the first and second rovers 110, 112, and wherein the separate mobile platform may be pushed or pulled by a rail-bike, hy-rail (SUV), or other similar device, including a mobile platform 102 with the first and second rovers 110, 112.

In the preferred embodiment, the mobile platform 102 is a hy-rail adapted Sport Utility Vehicle (SUV), although any other mobile platform so adapted to travel along a rail 120b of a track can be used including a rail bike, train engine/locomotive and track trolley.

In operation, the mobile platform 102 travels along the rails 120 being inspected at a generally constant velocity. By way of example, at 10 mph rail HADGPS coordinates are generated every 14.6 feet. The chosen velocity depends upon the required level of accuracy needed for rail surveying or monitoring applications. In fact, the present invention can be operated at speeds that exceed 15 mph; however for precision surveying applications, the preferred velocity is less than 3 mph.

Figure 2:
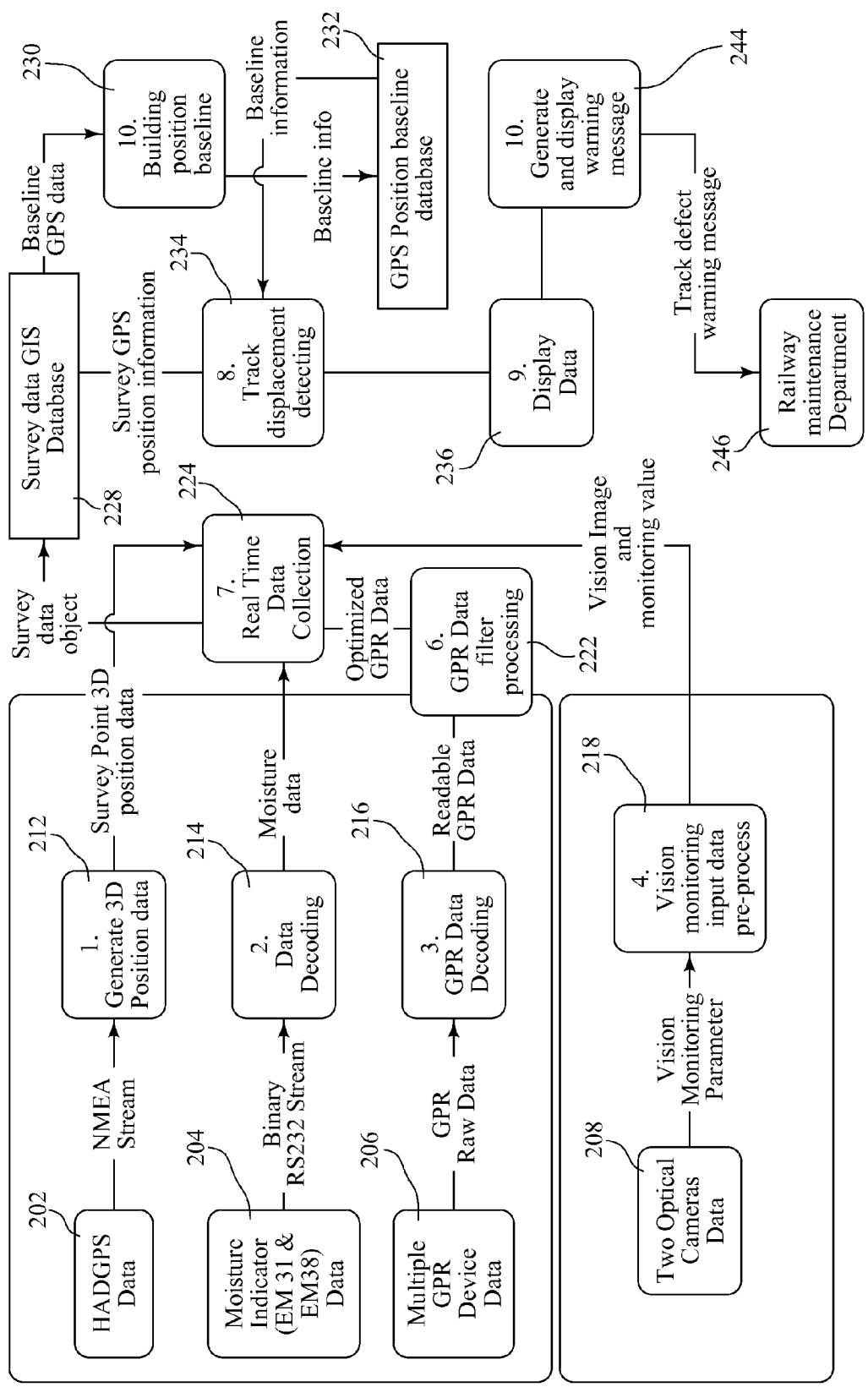
FIG. 2 is data flow diagram depicting the process of acquiring and generating rail track data.
Figure 17:
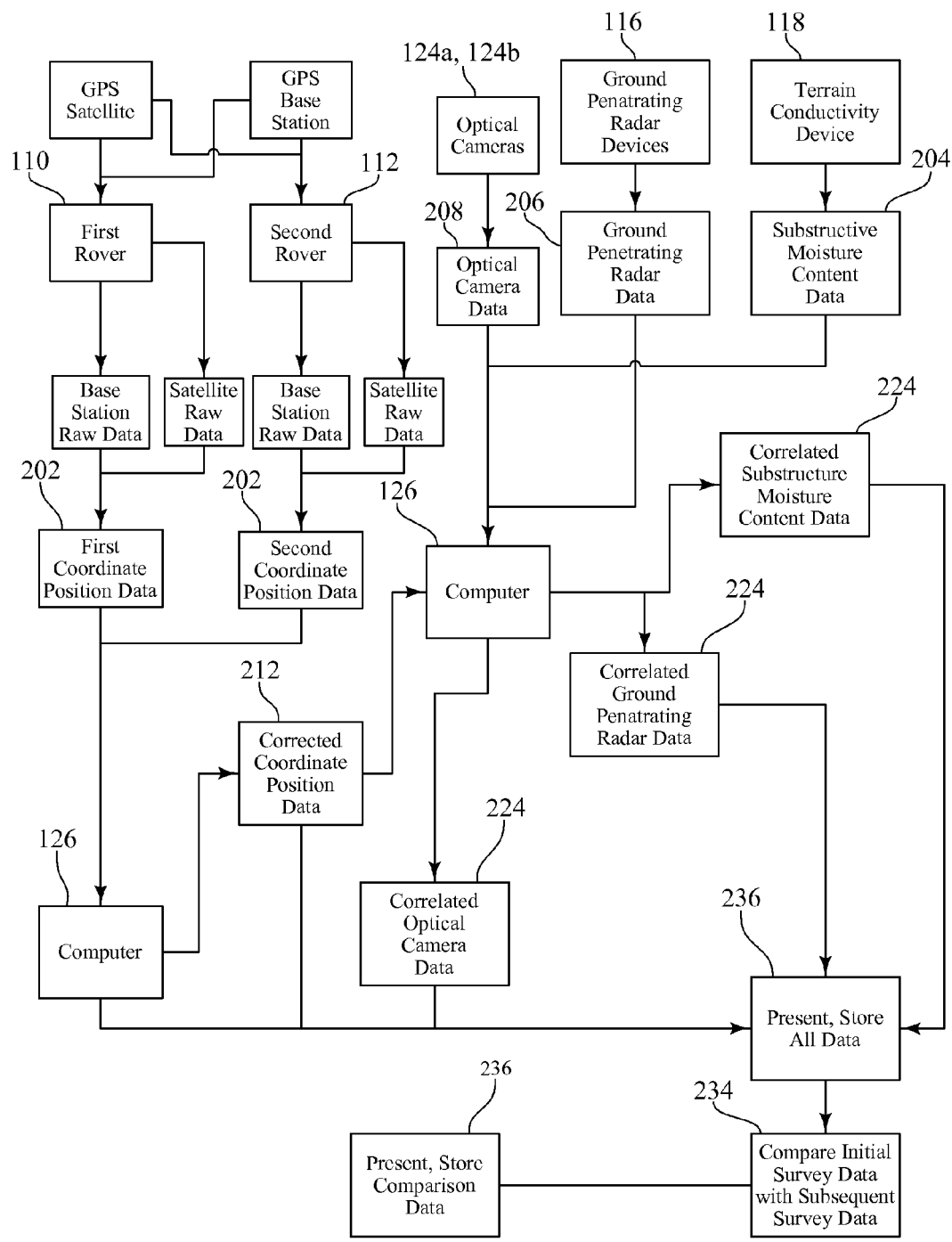
FIG. 17 is a flow chart showing the operation of the present invention.

FIG. 2 is a data flow diagram describing the preferred process of acquiring and generating rail track data wherein the first and second rovers 110, 112 and other non-invasive sensor devices 116, 118 are connected to a computer 126 by conventional means, including wireless communications. Alternatively, the operation of the present invention is shown in FIG. 17.

HADGPS data 202 is received by first and second rovers 110, 112. To facilitate communications, in the preferred embodiment, HADGPS data 202 is transmitted in a standard NMEA data stream format from the first and second rovers 110, 112. In one embodiment, HADGPS data 202 is generated every second. In step 212, HADGPS data 202 is decoded and processed and a three dimensional position data of a rail 120b being surveyed is generated via merging of coordinate position data from the first and second rover 110, 112. Three dimensional position data of the rail 120b being surveyed is a corrected coordinate position data 212 taking into account horizontal and vertical offset of the antenna phase centers 304, 306 in relation to the side edge 316 of the rail 120b being surveyed and taking into account changes in cross level 300 and track inclination angle θ 314. In the preferred embodiment, this is accomplished by correlating the HADGPS data 202 of the first rover 110 and the second rover 112 into the position of the rail 120b being surveyed. Specifically, the first rover 110 is positioned such its antenna phase center 304 (wherein the antenna phase center 304, 306 of each of the first and second rover 110, 112 is the measuring point used for each respective rover 110, 112) is aligned over the side edge 316 of the rail 120b being surveyed. The second rover 112 is positioned such that its antenna phase center 306 is aligned over the same side edge 316 of the same rail 120b as the first rover 110. The antenna phase center 304 of the first rover 110 and the antenna phase center 306 of the second rover 112 are preferably not at equal heights above the rail 120b. The positioning of the antenna phase centers 304, 306 of present invention is described in these terms for convenience purposes only. The antenna phase centers 304, 306 of the present invention may be positioned in any orientation, e.g., not aligned with the side edge 316 of the rail 120b being surveyed, provided that the vertical and horizontal offsets are accounted for.

In the preferred embodiment, the second rover 112 is positioned such that its distance above the rail 120b is closer to the rail 120b than the distance of the first rover 110 above the rail 120b. Alignment of the first and second rovers 110, 112 is accomplished with the use of a theodolite. A standard differential level circuit and steel tape is used to determine the horizontal and vertical offset from the rail 120b to the antenna phase center 304, 306 of each rover 110, 112. Entering the horizontal and vertical offset into the computer 126 in step 212 corrects for the predefined distance between the antenna phase centers 304, 306 of the first and second rovers 110, 112 and the side edge 316 of the rail 120b being surveyed.

In step 214, sensor data 204 from terrain conductivity devices 118 is acquired by a binary RS232 stream and decoded. Terrain conductivity is a very useful indicator of track bulk moisture in the track and substructure layering (lithology). Track bulk moisture directly influences the stability of the rail track 120a,b. Track bulk moisture also directly influences the dielectric constant and velocity of GPR electromagnetic (EM) waves in the track substructure matrix. Therefore, the terrain conductivity device 118 effectively produces dielectric constant and EM velocity data which is collected in step 224 and then used to filter and process the GPR data 206 in step 222. Additionally, in the preferred embodiment, the terrain conductivity device 118 data ("substructure moisture content data") are also correlated with the corrected coordinate position data 212 to produce location-tagged track bulk moisture (terrain conductivity) data ("correlated substructure moisture content data"). All terrain conductivity device 118 sensor data 204 is collected in step 224 in real time and is capable of being stored in the GIS database 228, and displayed (presented) as display data 236 in step 244 to a user.

In step 216, sensor data 206 from multiple GPR devices 116 is acquired and decoded. In step 222, the GPR raw data 206 undergoes filter processing to optimize GPR data 206. Sensor data from terrain conductivity devices 118 analyzed with sensor data from GPR devices 116 may indicate subsurface (ballast) anomalies and potential cause of track displacement exceptions. In the preferred embodiment, the GPR sensor component has been configured producing GPR images correlated with corrected position coordinate data in real-time. The system is preferably operated using two 500 MHZ GPR devices. In step 218, optical camera data 208 from two optical cameras 124a,b is acquired and optical camera images (vision monitoring) input data is pre-processed. In the preferred embodiment, an optical camera 124a at the front 104 is directed at a long view of the track 120a,b ahead, that takes in mainly the superficial aspects of the track 120a,b, but also other assets (bridges, tunnels etc). Additionally, an optical camera 124b at the rear 106 of the platform 102 is inclined downwards to provide a closer view of the track structure (rail 120b, ties 122, ballast, fasteners etc). Both optical cameras 124a,b are preferably continuous video generating optical camera data 208.

In step 224, the three dimensional, or corrected coordinate position data 212 of the rail 120b, GPR data (ground penetrating data) 206, terrain conductivity data (substructure moisture content data) 204, and optical camera data 208 is acquired, correlated, and collected in real-time while the platform 102 moves along a rail 120b. In the preferred embodiment, the GPR data 206, terrain conductivity data 204, and optical camera data 208 can be merged with corrected coordinate position data of step 212 and tagged with accurate position location data (corrected coordinate position data 212). In one embodiment, preferably all data collected real time in step 224 is stored in a survey data GIS database 228 for data archival, extraction, loading, transformation and baseline comparative analysis while the mobile platform 102 moves along the rail 120b. The preferred GIS database 228 is ARC-GIS. The collection process of 224 is continuously performed during normal operation of the system. In FIG. 2, step 230 analyzes the corrected coordinate position data 212 of the rail 120b and builds a position baseline generating a position baseline database 232 for the purposes of detecting track displacement in step 234. In FIG. 2, step 244 displays visually, or presents audibly or by any other sensorial means, all display data 236 acquired by the system to a user and further displays any track displacement or track anomalies. In the preferred embodiment, computer code written in C++ programming language filters the surface noise and presents a clear sensor (GPR, terrain conductivity, etc.) image for evaluation purposes. This system also includes data interpretation code which is to transfer the raw data from all sensors, including HADGPS data 202, terrain conductivity data 204, GPR data 206, to recognizable data form suitable for viewing.

In the preferred operation of the system, track displacement detection 234 occurs after an initial GIS database 228 and position baseline 232 is set and subsequent inspections of the same rail 120b section are made. In the preferred embodiment, the initial GIS database 228 and position baseline 232 data is collected during an initial survey wherein the mobile platform 102 travels at a velocity of no more than three miles per hour. The inspection data from a subsequent survey is performed using the platform apparatus, sensors, and processes already described. Once the subsequent survey data is collected, it is compared to both the GIS database 228 and the baseline database 232 as well as any intervening inspection data that has been stored by the system in the GIS database 228, thereby generating comparison data. This comparison indicates whether the rails 120a,b have moved (difference in values) or have not moved (data values from different survey are identical or are within a predefined error tolerance), as well as any subsurface activity; that is, the terrain under a section of track 120a,b is analyzed for defects, such as, movement, weak areas, cracks, fissures, and the like. In the preferred embodiment, the software tools of ESRI's MapObjects are used to process, store, and compare the data enabling track displacement detection. If the rails 120a,b have moved or exhibit an anomaly or have been otherwise compromised, the user is notified by means of step 236 of the comparison data or by a warning message generated by the system 244 and the corresponding rails 120a,b can be closed for needed repair and maintenance by the railway maintenance department 246. Once any such repairs have been made, the system can be run over that section of track 120a,b another time to ensure that the repairs were made properly and that the tracks 120a,b are safe for use. In operation, subsequent inspections of the rails 120a,b can be made at any point in the future, e.g., weekly, monthly, annually, or after a possible position altering event, e.g., an earthquake, hurricane, mud slide, train derailment, etc.

In the preferred embodiment, if a defect is found in the substructure or superstructure of the track 120a,b being tested then an alarm 244, by audio, visual or other means, is generated to alert an operator, such as a railway maintenance department 246, of the defect in realtime. Similarly, all such real-time displays, reports, and data can also display that no defect is found. In addition to a real-time mode, the data may be presented at a later date in the form of a report or display, along with any appropriate alarms or warning indicators 244. Also in the preferred embodiment, the magnitude of the track displacement, during a specific time period, that is regarded as a concern is pre-defined. Code written in C++ programming language calculates the distance between the new corrected position coordinate position data, perpendicular to the base-line created from the initial run. Then any track displacement exceeding (the value determined, for example, by a railroad company or any overseeing entity) a pre-determined value for a section (10 to 30 feet) of track is 'red-flagged' as an exception. The display data 236 is displayed by step 244 in a color-code on a monitor in real time. The data may also be post-processed.

The processes of FIG. 2 are continuously performed during normal operation of the system both during the creation of an initial database and for all inspection runs while the mobile platform 102 moves along a rail 120b. In addition, in the preferred embodiment, the system inspects and surveys one rail, e.g. rail 120b, at a time. Upon completion of the inspection and survey of that rail 120b, the system is turned around such that it then inspects and surveys a second rail, e.g., 120a. Thus, both rails 120a,b of a track are inspected and surveyed. Obviously, in a monorail system, only the single rail is surveyed.

The use of a first and second rover 110, 112 in the system uniquely comprises the means to determine whether there is track inclination perpendicular to the track 120a,b (also know as Cross-level inclination) necessary for accurate three dimensional data position of the rail 120b that is generated by step 212 of the rail 120b being surveyed. FIG. 3 shows a cross-section view of a preferred mobile platform 102 and demonstrates the vertical error 310 and horizontal error 312 due to track inclination. Track inclination is often expressed in inches (of lift) or degrees. Position data of the rail will not be accurate if there is inclination of the track 120a,b, unless the vertical error 310 and the horizontal error 312 is accounted for in step 212. As depicted in FIGS. 3, 4, 5, 6a, 6b, 7a, 7b, and 7c, track inclination angle θ 314 of the cross level 300 of the track 120a,b can be determined by basic application of trigonometry using the HADGPS data 202 from the first rover 110 and the second rover 112 of the apparatus. The change in gradient parallel (tangent) to the track direction is very small compared to the track inclination angle θ 314 and therefore neglected. The system produces a high degree of accuracy. In the preferred embodiment, the software tools of ESRI's MapObjects process the spatial geometric data functions and enables coordinate corrections.

FIG. 3 also depicts the mobile platform 102 comprising wheels 302 to roll along the rails 120a,b of the track. In the preferred embodiment, to negate the 'hunting' effect, or sideways movement of the platform 102 to which the first and second rovers 110, 112 are attached, double-flanged wheels are used wherein the wheels 302 are capable of traveling the rails 120a,b smoothly. Alternatively the wheels 302 can be used in conjunction with a conventional suspension system.

In order to determine track inclination and to make coordinate correction to accurately represent the position of the rail 120b being surveyed, the antenna phase center 304 of the first rover 110 is distanced higher above the head 802 of the rail 120b than the antenna phase center 306 of the second rover 112. This configuration is depicted in more detail in FIG. 5 and FIG. 6a.

Figure 4:
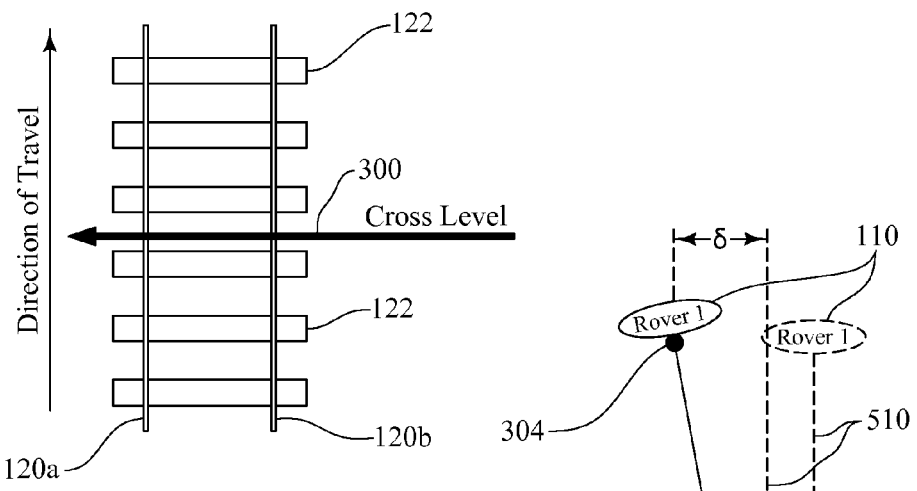
FIG. 4 shows a top view, in simplified form, of rail track and cross level direction.

FIG. 4 depicts for convenience a simple rail track system showing the direction of cross level 300.

Figure 5:
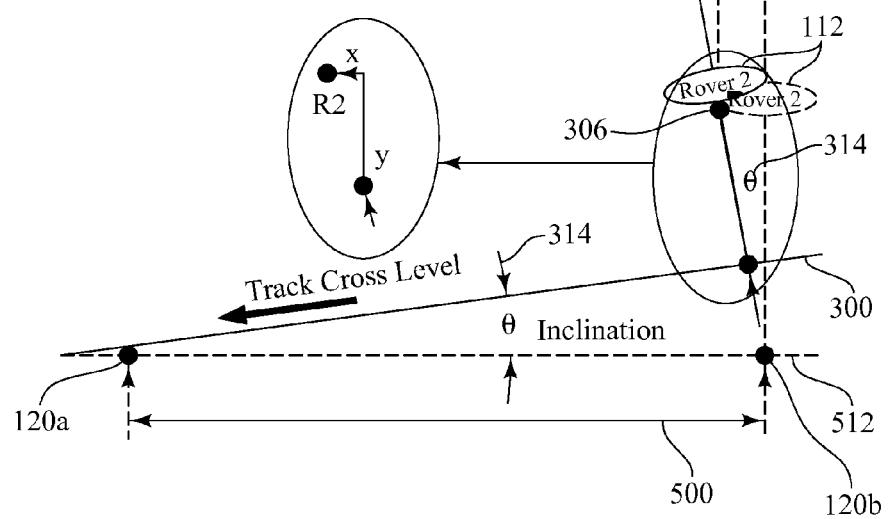
FIG. 5 shows a cross-section view of track inclination angle, track cross level, and simplified trigonometric relationships.

As shown in FIG. 5, by using simple trigonometry, the system makes coordinate corrections necessary to correct the adjust for the misalignment of the first and second rovers 110, 112 by calculating the changes in the cross level 300 and inclination angle θ 314.

Figures 6A, 6B:
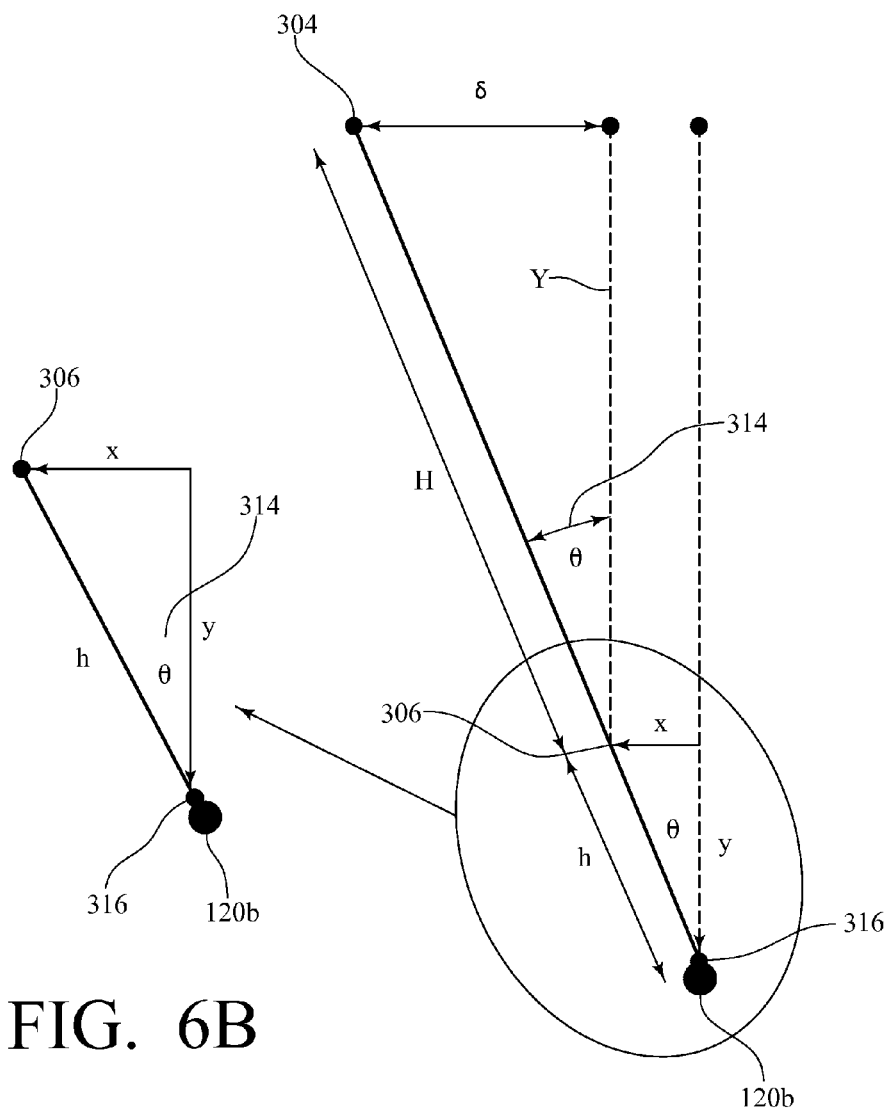
FIG. 6a shows basic trigonometric relationships for correcting vertical and horizontal error with two GPS receivers positioned over a rail.
FIG. 6b shows basic trigonometry relationships for correcting vertical and horizontal error specifically with reference to the rover positioned closer to the head of the rail.

As shown in FIG. 5, FIG. 6a, and FIG. 6b, it would be readily apparent for one skilled in the art to see how track inclination angle θ 314 is determined using simple trigonometry wherein the $\sin\theta = \delta/H = x/h$ and $\cos\theta = y/h = Y/H$ wherein 510 is a vertical axis and 512 is a horizontal axis. 'x' represents a horizontal distance between the side edge 316 of the rail 120b and the antenna phase center 306 of the second rover 112. δ represents a horizontal distance between the antenna phase center 306 of the second rover 112 and the antenna phase center 304 of the first rover 110. 'H' represents the length of a hypotenuse, the length from the antenna phase center 306 of the second rover 112 and the antenna phase center 304 of the first rover 110. 'h' represents the length of a hypotenuse, specifically the length from the antenna phase center 306 of the second rover 112 to the side edge 316 of the rail 120b. 'y' represents a vertical distance between the side edge 316 of the rail 120b and the antenna phase center 306 of the second rover 112. 'Y' represents a vertical distance between the antenna phase center 306 of the second rover 112 and the antenna phase center 304 of the first rover 110. Thus, horizontal error 312 correction $'X' = (h) \times \delta/H$ and vertical error 310 correction $'Y' = h(1-(\delta/H)^2)^{1/2}$.

In the preferred embodiment 'h' is fixed at about 20 inches or less. In the preferred embodiment, 'H' is fixed at about 6 feet when the first rover 110 is attached to a mobile platform 102 being a hy-rail adapted SUV.

Similarly, FIGS. 7a, 7b, and 7c further demonstrate the basic trigonometry relationships for correcting vertical error 310 and horizontal error 312 of the system. In this representation, the two HADGPS data 202 streams from first rover 110 and second rover 112 are not synchronized. For the purposes of a graphic explanation only, in FIG. 7a, 700 represents a plurality of antenna phase center data points 304 from the HADGPS data 202 streams generated by the first rover 110 as plotted on a standard coordinate axis while the platform 102 travels wherein 704 is the x axis, 706 is the y axis, and 708 is the z axis. Similarly, 702 represents a plurality of antenna phase center data points 306 from the HADGPS data 202 stream generated by the second rover 112 as plotted on a standard coordinate axis as the platform 102 travels. FIG.

7b then portrays a representation of a line connecting the antenna phase center data points 700 from the HADGPS data 202 of first rover 110, connected point to point. Once the HADGPS data 202 from the second rover 112 is acquired, inclination angle θ 314 and proper coordinate corrections can be calculated as seen in FIG. 7c by simple trigonometry.

Figure 8:
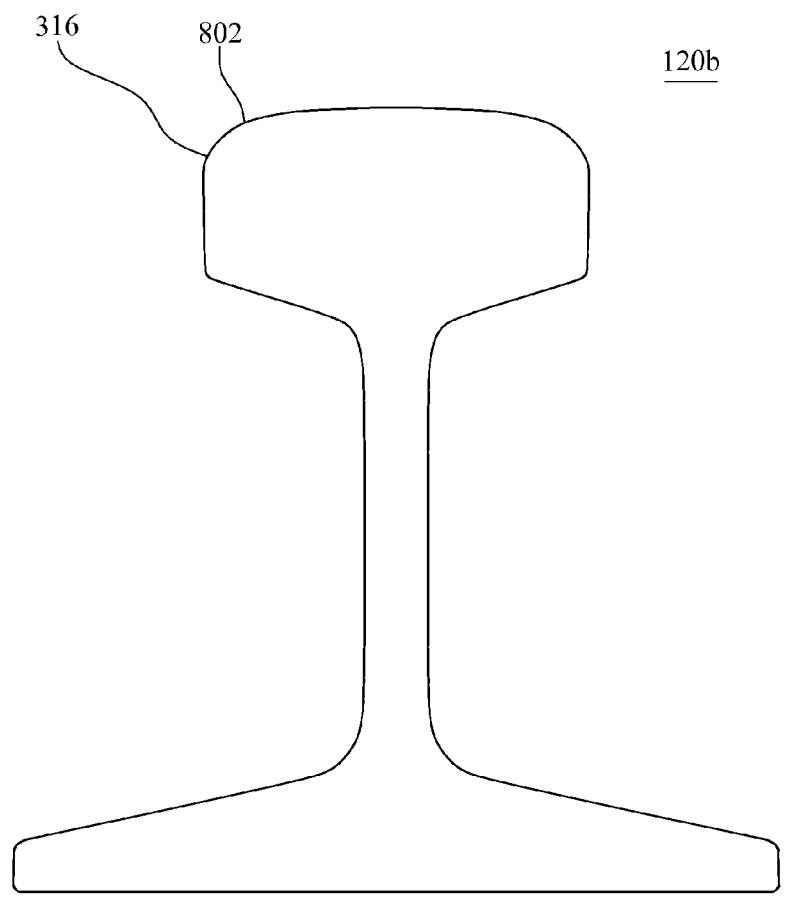
FIG. 8 shows a cross-section of a rail.

FIG. 8 shows a standard rail showing a side edge 316 of the rail 120b and the head 802 of a rail 120b.

Figure 9:
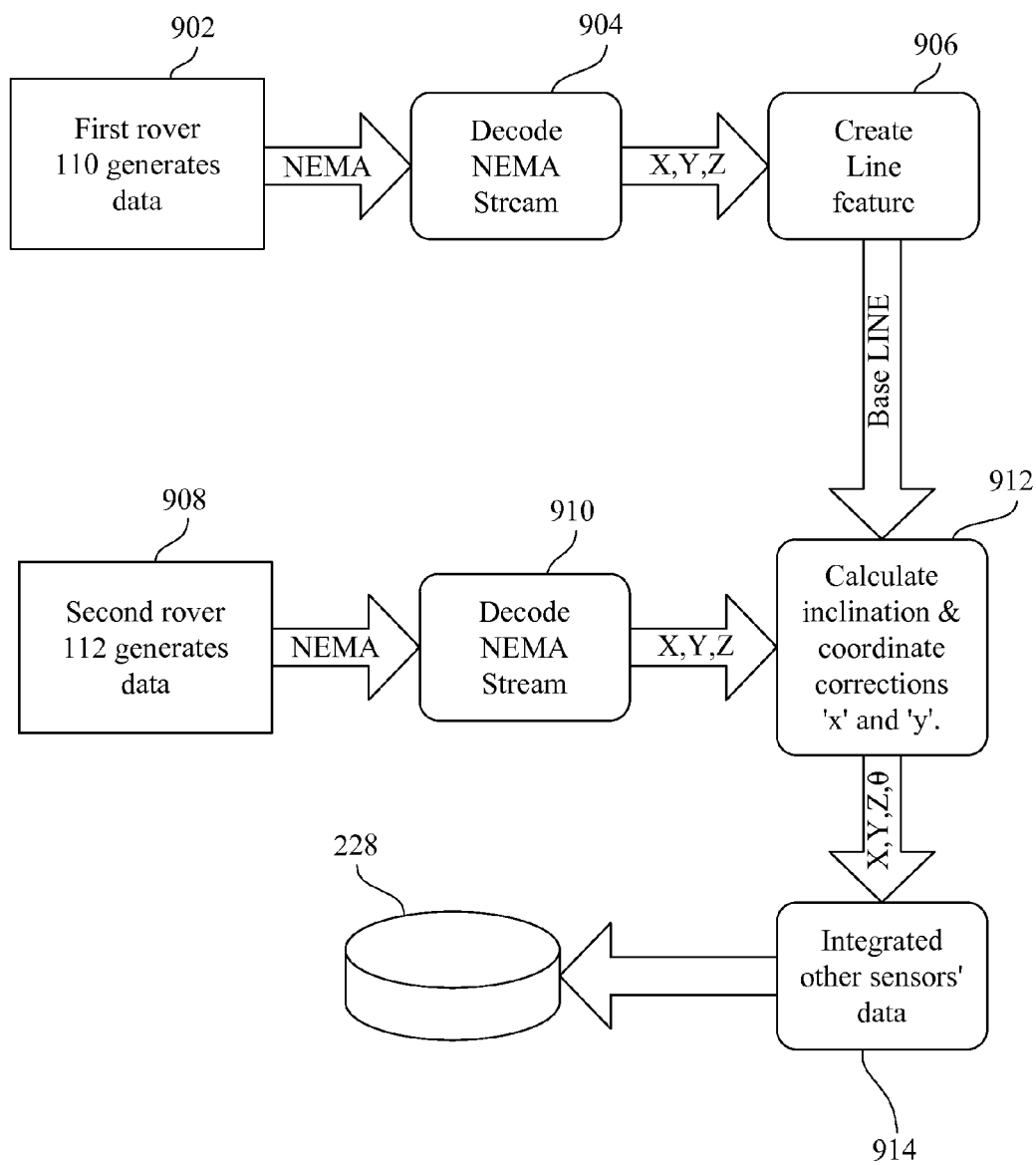
FIG. 9 is a data flow diagram of the process of calculating track inclination and coordinate corrections from two GPS receivers.

As shown in FIG. 9 is the data flow for determining of track inclination and for coordinate correction. In step 902, the first rover 110 generates HADGPS data 202 which step 904 acquires and decodes the NMEA data stream into standard data coordinates X, Y, Z. In step 906, the data coordinates create a line function by connecting the data points 700 from the first rover 110 together, point to point. This was portrayed by way of example in FIG. 7b. In the preferred embodiment, a β-spline or other conventional best curve fit algorithm is used. Additionally, in step 908 the second rover 112 generates HADGPS data 202 which step 910 acquires and decodes the NMEA data stream into standard data coordinates X, Y, Z. In step 912, the track inclination and coordinate corrections are made to reflect the accurate position of the rail 120b being surveyed. This data is integrated with other sensor data, e.g., sensors 116, 118, in step 914 and stored the GIS database 228 previously described. The process of FIG. 9 is continuously performed during normal operation.

Figure 10:
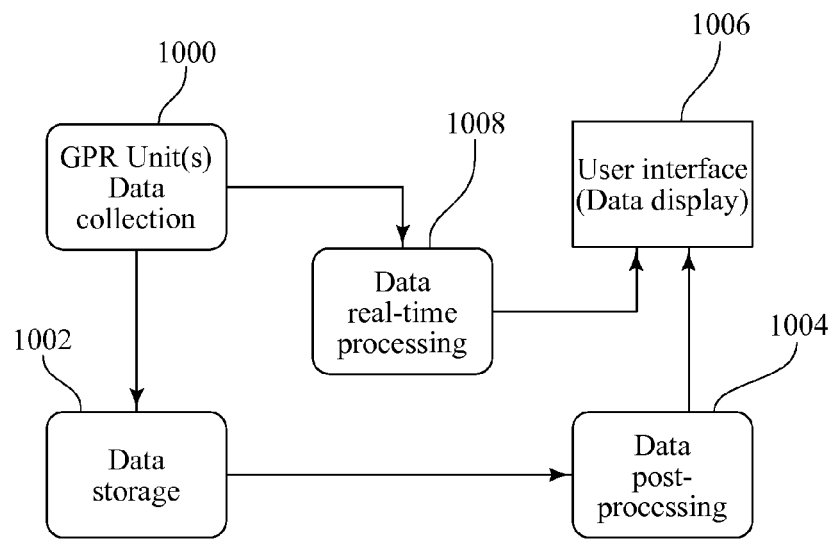
FIG. 10 is a flow chart of GPR real time data processing.

FIG. 10 is a flow chart describing the GPR data processing of the system. In step 1000, the GPR devices 116 collect data 206. The GPR data 206 is stored in step 1002 and in step 1004 is for post-processing data applications which is then displayed to the user by a user interface by conventional display means in step 1006. Alternatively, the GPR data 206 in step 1008 can be processed in real-time and displayed by conventional means through a user interface in step 1006.

Figure 11:
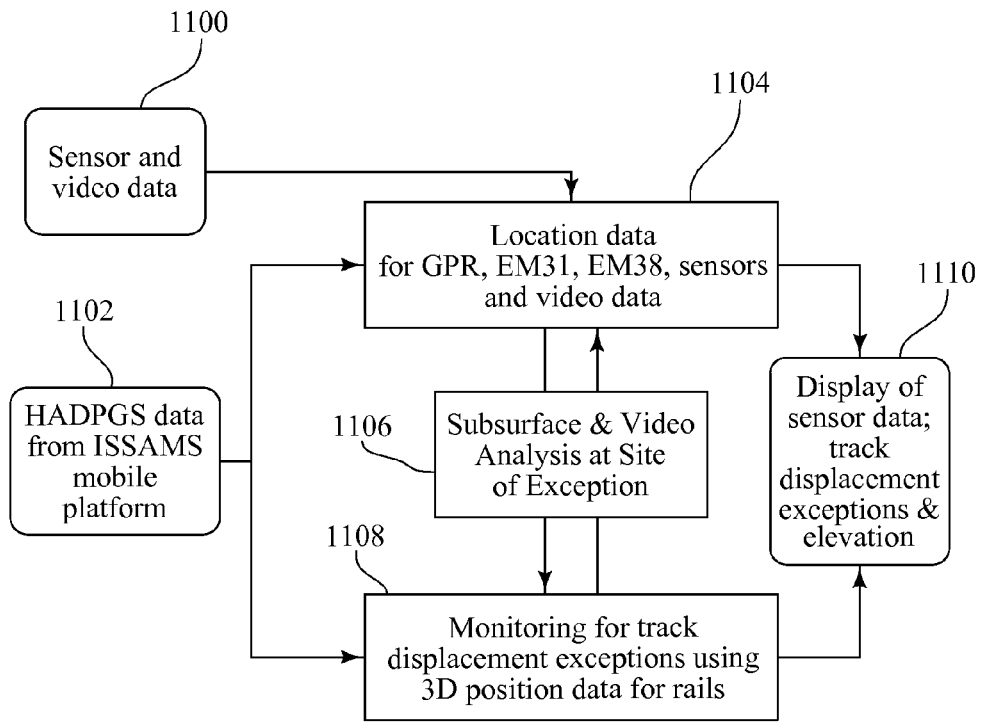
FIG. 11 is flow chart of track displacement exception detection and subsurface anomaly evaluation system.

FIG. 11 is a flow chart describing the track displacement exception detection and subsurface anomaly evaluation components of the system. The system provides for a plurality of different data merging configurations of the sensor data 1100 which can be displayed 1110 or reviewed at the site of exception 1106 during post processing applications. In this embodiment, GPR data 206, terrain conductivity data 204, and optical camera data 208 collected in step 1100 is merged with corrected coordinate position data 212 of step 1102 in step 1104 and tagged with accurate position location data. If an anomaly is identified in real-time kinetic (RTK) processing or post-processing then the location is tagged with a coordinate and can easily be found again if a more detailed evaluation is require or a track site visit. The data set can alternately be displayed 1110 or analyzed for subsurface and optical camera image exceptions 1106 and then be merged with a data set of the track displacement exceptions 1108. The data is acquired by the means already discussed. Alternatively, in step 1108 the survey track displacement data generated from corrected coordinate position data 212, 1102 can be displayed 1110 or analyzed for subsurface and optical camera image exceptions 1106 and then be merged with a data set of sensor 116, 118 and optical camera image data of 1100 tagged to location data in 1104.

Figure 12:
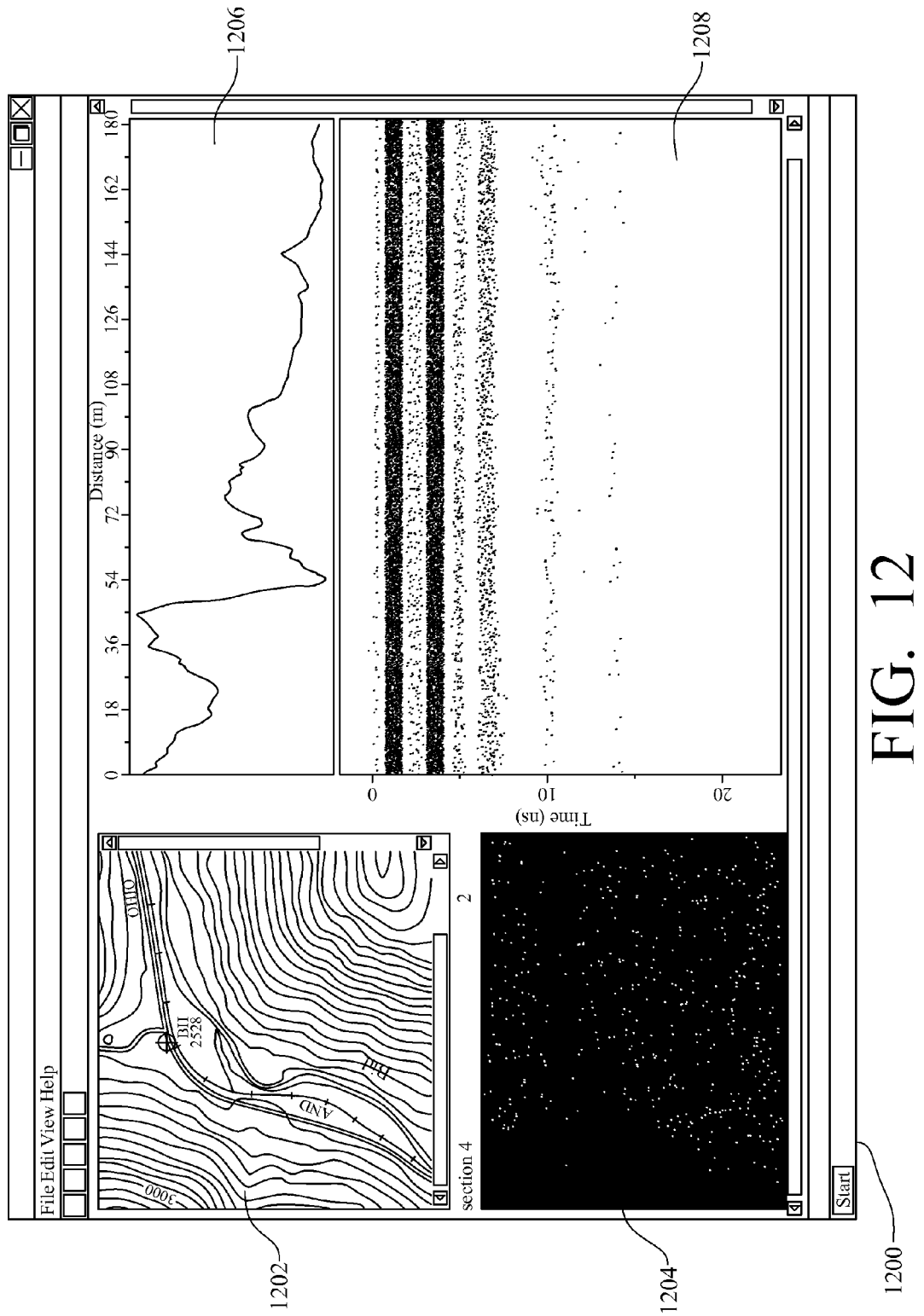
FIG. 12 shows, in one exemplary format, a screen shot of system data display.

As seen in FIG. 12, 1200 is a screen display shot showing display data 236, wherein 1202 is a graphic representation of corrected coordinate position data 212, 1204 is optical camera image data 208 display, 1206 displays graphically track elevation data generated by the system, and 1208 graphically represents GPR data 206. This configuration of display is one embodiment of step 236, wherein all data collected by the system, including all data sets created or stored by the system per step 224, 228, 232, is presented to the user by any sensorial means and can further notify or alert the user of track displacements detected 234 or other track anomalies. In the preferred embodiment, all data is stored and retrieved when required and can be presented. A monitor displays images generated from the data. Data collected may include single or multiple GPR devices 116 (real-time pre-processed) data 206, ground or terrain conductivity sensor data 204 that may indicate substructure bulk moisture, track surface optical camera image data 208 preferably from two optical cameras 124a,b, track displacement and exceptions data noted by the system including track displacement detecting 234, and elevation data. Additionally, track surface optical camera images provide useful information during a post inspection evaluation. In one embodiment, GPR image processing software provides a graphical representation of the GPR raw data 206. Additionally, in one embodiment, the separate data streams from the different sensor devices 116, 118 are sent through a TCP/TP network to a host computer 126 where the raw and processed data are displayed and viewed on one screen 1200 by operator and/or at a central site. In the preferred embodiment, different sensor data are displayed on the same screen 1200 with same lateral coordinates as to make data visual and comparable. In the preferred embodiment, step 236 provides means for graphically representing the display data 236 collected by the system including graphical images for GPR data 206, optical camera data 208, terrain conductivity data 204, elevation data, GIS database 228, corrected coordinate position data 212, track displacement detections 234, data and using color codes to easily identify and distinguish different data.

Figure 13:
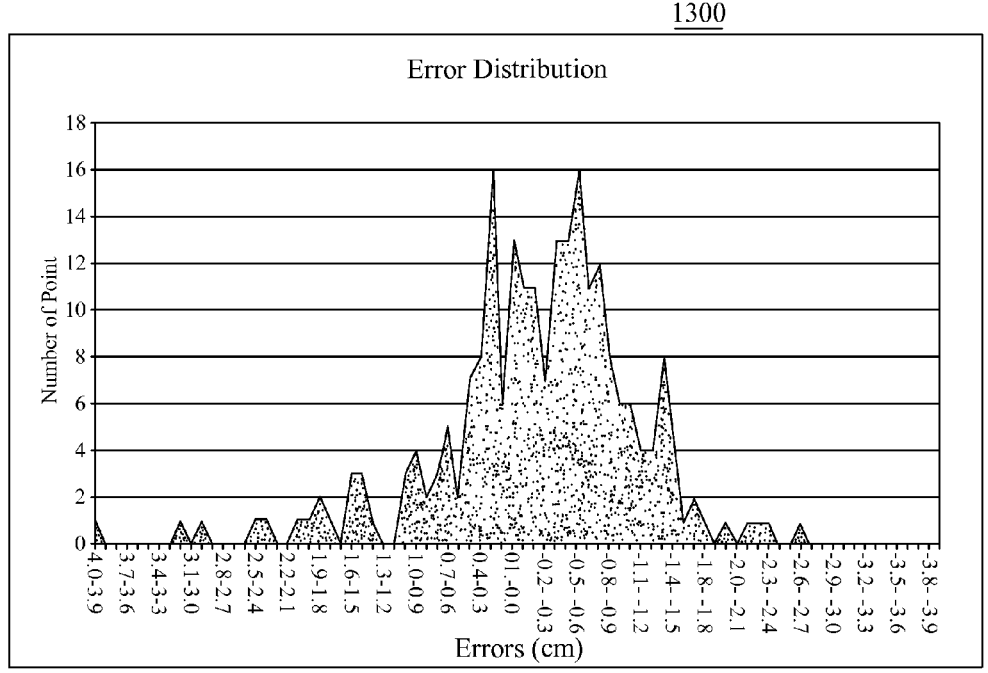
FIG. 13 is a table representing the error (Gaussian) distribution curve for new survey points to baseline GPS data.

FIG. 13 is a representation 1300 of the accuracy of the system when comparing new survey points to an established baseline database 232. As discussed, once a baseline 232 is established, future data sets can be compared to the baseline database 232 for the purpose of track displacement detection 234 or otherwise merged into the GIS database 228. In the shown representation 1300, the accuracy of the system is then shown and used to adjust the system as needed.

Figure 14:
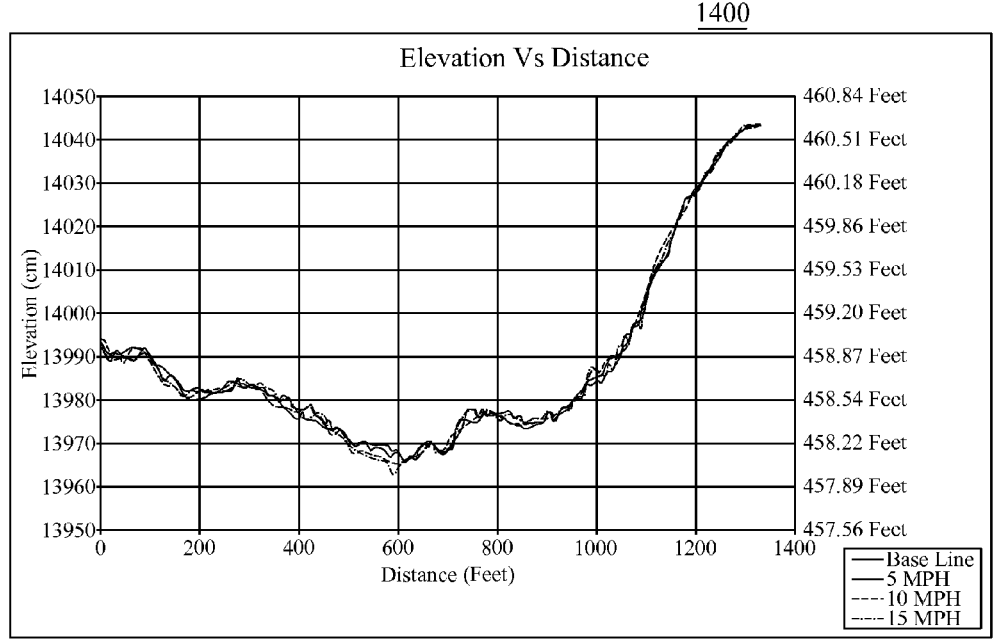
FIG. 14 is a table representing elevation data from GPS surveys traveling at varying velocities.

FIG. 14 shows the consistency 1400 of the apparatus by plotting the elevation and distance data from three different surveys and comparing each to the established baseline in same manner as described herein where one survey was conducted at a velocity of 5 mph, another at 10 mph, and another at 15 mph.

FIG. 15 and FIG. 16 respectively plot the horizontal and vertical components of the preferred embodiment of the apparatus traveling at 5, 10, and 15 mph to a baseline database 232 of the rail 120b being inspected, wherein the FIG. 15 and FIG. 16 demonstrate the high accuracy 1500, 1600 of the system while operating at high speeds.

As would be evident to anyone skilled in the art, GIS database 228 and the position baseline database 232 can be combined, stored, compared, processed, displayed, merged, and processed for any number of modeling applications. Modeling applications include, but are not limited to, determining rail displacement 234 or other rail 120a,b defects and for even non-railroad applications.

In the preferred embodiment, the first and second rovers 110, 112 are oriented and configured to reduce data drop out. Because data drops often occur as a break from communication links with the satellites, in the preferred embodiment, the first rover 110 is on the highest point of the platform 102 thereby maximizing the sky visibility to the GPS antenna thereby reducing data dropouts. In this configuration, the high above ground placement of the first rover 110 is preferred. Additionally, in the preferred embodiment, the antenna phase center 304 of the first rover 110 is aligned with the side edge 316 of the rail 120b. A standard differential level circuit and steel tape are used to determine the horizontal and vertical offset from the side edge 316 of the rail 120b to the antenna phase center 304 of the first rover 110. Entering the horizontal and vertical offset into the computer 126 corrects the coordinate data to correspond to the coordinates of the rail 120b being surveyed. Additionally, in the preferred embodiment, the second rover 112 is extended from the platform 102 and positioned as close to the rail 120b as possible. The antenna phase center 306 of the second rover 112 should be position directly over the side edge 316 of the rail 120b being surveyed. There should be a sufficient distance between the rail 120b and the second rover 112 so that the second rover 112 does not interfere with the travel of the platform 102, can clear switches, and will not hit the rail 120b. Alignment of the second rover 112 is accomplished with the use of a theodolite. Specifically, the antenna phase center 306 of the second rover 112 is aligned with the side edge 316 of the rail 120b. A standard differential level circuit and steel tape are used to determine the horizontal and vertical offset from the side edge 316 of the rail 120b to the antenna phase center 306 of the second rover 112. Entering the horizontal and vertical offset into the computer 126 corrects the coordinate data to correspond to the coordinates of the rail 120b being surveyed.

The preferred distance of the antenna phase center 306 of the second rover 112 above the rail 120 is a maximum distance of 20 inches as measured from the head 802 of the rail 120. The preferred distance of the antenna phase center 304 of the first rover 110 approximately 6 feet above the antenna phase center 306 of the second rover 112. This preferred configuration reduces system errors.

In the preferred embodiment, an extended arm 114 attached to the platform 102 at one end is connected to a double-flanged wheel 302 which wheel rolls along the rail 120 as the mobile platform 102 travels. This forms a base to which the second rover 112 is attached. In trials, a rail lubrication device made by Portec, Inc., a company based in Huntington, West Va. was adapted and used as the extended arm 114. It would be readily evident to one skilled in the art of alternative extensions that could be used to which a rover can be attached that would perform the function of extending the rover away from the platform 102 and closer to the rail 120.

The preferred mobile platform 102 is a hi-rail SUV adapted vehicle as it provides adequate track and switch clearance and unlike a track trolley it does not bottom or need to be lifted at crossings. However, a track trolley or rail bike are small, light, and easy to transport and can serve as acceptable alternatives. Additionally, a train or locomotive engine can serve as a mobile platform 102 with the advantage that it can push train cars that may be in the path during the surveying or modeling applications.

It would be readily apparent for one of ordinary skill in the relevant art to design and implement the described system of the present invention. The preferred embodiment of the software is written using the Visual C++ programming language, but this is for convenience purpose only. Any comparable programming language may be used.

All described hardware components are commercially available. It would be readily apparent to one of ordinary skill in the relevant arts to design and manufacture the system as described herein. Likewise the chosen hardware devices is for convenience purpose only wherein comparable devices may be substituted.

In an alternative embodiments, the devices are not connected to a computer 126 by conventional cabling or via a wireless connections. Such wireless connections are well known in the relevant art such that it would be readily apparent to one of ordinary skill in the relevant art to implement the present invention using wireless technology. Connections can therefore be accomplished using RS-232 to Ethernet or TCP/IP converter, 802.11g wireless hub, etc. Other alternative embodiments include storing all data in a central database where users may access this data either real time or at a later date. The data may even be made available over a wide area network, such as the Internet.

In the preferred embodiment, data acquisition includes two parts of code: one is serial port data acquisition, and the second is GPR data 206 acquisition. In serial port data acquisition, the system receives the HADGPS data 202, digital compass data and distance encoder data, the moisture indicator and terrain conductivity device (EM38, EM31) sensor data 204, and optical camera data 208. Each device's data acquisition is running separately using Visual C++ multi-thread technology. Preferably, all data, including GPR data 206, HADGPS data 202, digital compass data and distance encoder data, the moisture indicator and terrain conductivity device 118 (EM38, EM31) sensor data 204, and optical camera data 208 is decoded using data interpretation code which manipulates the raw data to recognizable and usable data format, permitting the sensor data to be correlated or tagged with the precise position location coordinates and stored in a common GIS database 228.

As discussed, system data processing includes GIS data processing and GPR data processing. In the preferred embodiment, GIS data processing incorporates ESRI's MapObjects tools to automate the data display, track modeling, and the spatial data processing, wherein spatial data processing tools aid in processing track displacement exceptions and cross level 300 coordinate corrections. The data processing also includes filters for processing the raw GPR data 206 signals.

The present invention is described in terms of surveying rails and analyzing terrain substructure under a pair of rails, e.g., a railroad track, but this is for convenience. It would be readily apparent to one of ordinary skill to use the present invention to analyze the terrain substructure under a roadbed, a building, bridge supports, stadium, etc.

All described hardware components are commercially available. It would be readily apparent to one of ordinary skill in the relevant arts to design and manufacture the system as described herein. In addition, the preferred system is described as using one platform, but this too is for convenience. The present invention may be implemented using any number of platforms. In an embodiment using multiple platforms on a pair rails, if is preferable that sufficient time lapse between runs for the rails to stop vibrating in order to achieve accurate surveying and monitoring data.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:
1. A high accuracy track surveying system, comprising:
a mobile platform adapted to travel along a track in a direction of travel, said track having a first rail and a second rail;

a first rover mounted on said mobile platform, wherein said first rover comprises a first high accuracy differential global positioning system receiver having a first antenna phase center positioned near a highest point of the platform and at a first predefined distance of more than twenty inches over the first rail when said mobile platform travels along the track, and wherein said first high accuracy differential global positioning system receiver is adapted for receiving first raw data from a global positioning system satellite and a global positioning system base station when said mobile platform travels along the track;

a second rover mounted on said mobile platform at a spaced horizontal distance from said first rover, wherein said second rover comprises a second high accuracy differential global positioning system receiver having a second antenna phase center positioned at a second predefined distance of no more than twenty inches above and over the first rail when said mobile platform travels along the track, wherein said second high accuracy differential global positioning system receiver is adapted for receiving second raw data from the global positioning system satellite and the global positioning system base station when said mobile platform travels along the track, wherein said first antenna phase center and said second antenna phase center are aligned over the first rail and oriented parallel to the direction of travel when said mobile platform travels along the track;

a computer adapted for communication with said first rover and said second rover, wherein said first rover transmits said first raw data to said computer when said mobile platform travels along the track, wherein said second rover transmits said second raw data to said computer when said mobile platform travels along the track, wherein said computer comprises a means for generating first coordinate position data representing a first computed positioning of a side-edge of the first rail using said first raw data and said first predefined distance, a means for generating second coordinate position data representing a second computed positioning of the side edge of the first rail using said second raw data and said second predefined distance, and a means for merging said first coordinate position data and said second coordinate position data thereby generating corrected coordinate position data; and a means for presenting data when said mobile platform travels along the track, wherein said data is selected from the group consisting of said first raw data, said second raw data, said first coordinate position data, said second coordinate position data, said corrected coordinate position data, a representation of said first coordinate position data, a representation of said second coordinate position data, a representation of said corrected coordinate position data, and combinations thereof.

2. The high accuracy track surveying system according to claim 1, wherein said second rover is attached to an arm extending from said mobile platform such that said arm extends in front of, behind, or to a side of said mobile platform.

3. The high accuracy track surveying system according to claim 1, wherein said first rover is attached to a roof rack on said mobile platform.

4. The high accuracy track surveying system according to claim 1, further comprising a means for storing said data.

5. The high accuracy track surveying system according to claim 4, further comprising a means for comparing said data collected during an initial survey with said data collected during a subsequent survey, thereby generating comparison data indicating differences between said data collected during said initial survey and said data collected during said subsequent survey, wherein said comparison data is generated when said mobile platform travels along the rail during said subsequent survey.

6. The high accuracy track surveying system according to claim 5, further comprising a means for presenting a representation of said comparison data when said mobile platform travels along the rail during said subsequent survey.

7. The high accuracy track surveying system according to claim 5, further comprising a means for storing said comparison data.

8. The high accuracy track surveying system according to claim 1, further comprising:
    a means for non-invasively penetrating terrain substructure under the rail and generating ground penetrating data when said mobile platform travels along the rail, wherein said means for non-invasively penetrating terrain substructure is attached to said mobile platform;
    a means for correlating said ground penetrating data with said corrected coordinate position data when said mobile platform travels along the rail, thereby generating correlated ground penetrating data; and
    a means for presenting a representation of said correlated ground penetrating data when said mobile platform travels along the rail.

9. The high accuracy track surveying system according to claim 1, further comprising:
    a ground penetrating radar device attached to said mobile platform, wherein said ground penetrating radar device generates ground penetrating data when said mobile platform travels along the rail;
    a means for correlating said ground penetrating data with said corrected coordinate position data when said mobile platform travels along the rail, thereby generating correlated ground penetrating data; and
    a means for presenting a representation of said correlated ground penetrating data when said mobile platform travels along the rail.

10. The high accuracy track surveying system according to claim 1, further comprising:
    a terrain conductivity device attached to said mobile platform, wherein said terrain conductivity device generates substructure moisture content data when said mobile platform travels along the rail;
    a means for correlating said substructure moisture content data with said corrected coordinate position data when said mobile platform travels along the rail, thereby generating correlated substructure moisture content data; and
    a means for presenting a representation of said correlated substructure moisture content data when said mobile platform travels along the rail.

11. The high accuracy track surveying system according to claim 1, further comprising:
    a ground penetrating radar device attached to said mobile platform, wherein said ground penetrating radar device generates ground penetrating data as said mobile platform travels along the rail;
    a means for correlating said ground penetrating data with said corrected coordinate position data when said mobile platform travels along the rail, thereby generating correlated ground penetrating data;

a means for presenting a representation of said correlated ground penetrating data when said mobile platform travels along the rail;

a terrain conductivity device attached to said mobile platform, wherein said terrain conductivity device generates substructure moisture content data as said mobile platform travels along the rail;

a means for correlating said substructure moisture content data with said corrected coordinate position data when said mobile platform travels along the rail, thereby generating correlated substructure moisture content data; and a means for presenting a representation of said correlated substructure moisture content data as said mobile platform travels along the rail.

12. The high accuracy track surveying system according to claim 11, further comprising a means for filtering said ground penetrating data using said substructure moisture content data as said mobile platform travels along the rail.

13. The high accuracy track surveying system according to claim 11, further comprising a means for storing said data, said correlated ground penetrating data, and said correlated substructure moisture content data.

14. The high accuracy track surveying system according to claim 13, further comprising a means for comparing said data, said correlated ground penetrating data, and said correlated substructure moisture content data collected during an initial survey with said data, said correlated ground penetrating data, and said correlated substructure moisture content data collected during a subsequent survey, thereby generating comparison data indicating differences between said data, said correlated ground penetrating data, and said correlated substructure moisture content data collected during the initial survey and said data, said correlated ground penetrating data, and said correlated substructure moisture content data collected during the subsequent survey, wherein said comparison data is generated when said mobile platform travels along the rail during the subsequent survey.

15. The high accuracy track surveying system according to claim 14, further comprising a means for presenting a representation of said comparison data when said mobile platform travels along the rail during the subsequent survey.

16. The high accuracy track surveying system according to claim 14, further comprising a means for storing said comparison data.

17. The high accuracy track surveying system according to claim 1, wherein the first predefined distance at which the first antenna phase center is positioned over the first rail is approximately six to eight feet.

18. The high accuracy track surveying system according to claim 1, wherein the first predefined distance at which the first antenna phase center is positioned over the first rail is at least six feet.

19. A method for surveying a track having a first rail and a second rail, comprising the steps of:
(a) placing upon the track a mobile platform of a high accuracy track surveying system, wherein said high accuracy track surveying system comprises:
said mobile platform adapted to travel along the track in a direction of travel;
a first rover mounted on said mobile platform, wherein said first rover comprises a first high accuracy differential global positioning system receiver having a first antenna phase center positioned near a highest point of the platform and at a first predefined distance of more than twenty inches over the first rail when said mobile platform travels along the track, and wherein said first high accuracy differential global positioning system receiver is adapted for receiving first raw data from a global positioning system satellite and a global positioning system base station when said mobile platform travels along the track;
a second rover mounted on said mobile platform at a spaced horizontal distance from said first rover, wherein said second rover comprises a second high accuracy differential global positioning system receiver having a second antenna phase center positioned at a second predefined distance of no more than twenty inches above and over the first rail when said mobile platform travels along the track, wherein said second high accuracy differential global positioning system receiver is adapted for receiving second raw data from the global positioning system satellite and the global positioning system base station when said mobile platform travels along the track, wherein said first antenna phase center and said second antenna phase center are aligned over the first rail and oriented parallel to the direction of travel when said mobile platform travels along the track;
a computer adapted for communication with said first rover and said second rover, wherein said first rover transmits said first raw data to said computer when said mobile platform travels along the track, wherein said second rover transmits said second raw data to said computer when said mobile platform travels along the track, wherein said computer comprises a means for generating first coordinate position data representing a first computed positioning of a side edge of the first rail using said first raw data and said first predefined distance, a means for generating second coordinate position data representing a second computed positioning of the side edge of the first rail using said second raw data and said second predefined distance, and a means for merging said first coordinate position data and said second coordinate position data thereby generating corrected coordinate position data; and
a means for presenting data when said mobile platform travels along the track, wherein said data is selected from the group consisting of said first raw data, said second raw data, said first coordinate position data, said second coordinate position data, said corrected coordinate position data, a representation of said first coordinate position data, a representation of said second coordinate position data, a representation of said corrected coordinate position data, and combinations thereof;
(b) moving said mobile platform along the track;
(c) receiving said first raw data and said second raw data as said mobile platform moves along the track;
(d) transmitting said first raw data and said second raw data to said computer as said mobile platform moves along the track;
(e) generating said first coordinate position data and said second coordinate position data as said mobile platform moves along the track;
(f) merging said first coordinate position data and said second coordinate position data, thereby generating said corrected coordinate position data, as said mobile platform moves along the track; and
(g) presenting said data as said mobile platform travels along the track.

20. The method according to claim 19, further comprising the steps of:

(h) storing said data in a means for storing said data as said mobile platform moves along the rail, wherein said high accuracy track surveying system further comprises said means for storing said data;

(i) comparing said data collected during an initial survey with said data collected during a subsequent survey, thereby generating comparison data indicating differences between said data collected during the initial survey and said data collected during the subsequent survey, wherein said comparison data is generated as said mobile platform travels along the rail during the subsequent survey;

(j) presenting a representation of said comparison data as said mobile platform travels along the rail during the subsequent survey;

(k) storing said comparison data in a means for storing said comparison data as said mobile platform moves along the rail, wherein said high accuracy track surveying system further comprises said means for storing said comparison data.

21. The method according to claim 19, further comprising the steps of:

(h) generating ground penetrating data via a ground penetrating radar device as said mobile platform travels along the rail, wherein said high accuracy track surveying system further comprises said ground penetrating radar device attached to said mobile platform;

(i) generating substructure moisture content data via a terrain conductivity device as said mobile platform travels along the rail, wherein said high accuracy track surveying system further comprises said terrain conductivity device attached to said mobile platform;

(j) correlating said ground penetrating data with said corrected coordinate position data as said mobile platform travels along the rail, thereby generating correlated ground penetrating data;

(k) correlating said substructure moisture content data with said corrected coordinate position data as said mobile platform travels along the rail, thereby generating correlated substructure moisture content data; and (l) presenting a representation of said correlated ground penetrating data and said correlated substructure moisture content data, as said mobile platform travels along the rail, via a means for presenting, wherein said high accuracy track surveying system further comprises said means for presenting.

22. The method according to claim 21, further comprising the steps of:

(m) storing said data, said correlated ground penetrating data, and said correlated substructure moisture content data in a first means for storing, as said mobile platform moves along the rail, wherein said high accuracy track surveying system further comprises said first means for storing;

(n) comparing said data, said correlated ground penetrating data, and said correlated substructure moisture content data collected during an initial survey with said data, said correlated ground penetrating data, and said correlated substructure moisture content data collected during a subsequent survey, thereby generating comparison data indicating differences between said data, said correlated ground penetrating data, and said correlated substructure moisture content data collected during the initial survey and said data, said correlated ground penetrating data, and said correlated substructure moisture content data collected during the subsequent survey, wherein said comparison data is generated as said mobile platform travels along the rail during the subsequent survey;

(o) presenting a representation of said comparison data as said mobile platform travels along the rail during the subsequent survey; and (p) storing said comparison data in a means for storing said comparison data as said mobile platform moves along the rail, wherein said high accuracy track surveying system further comprises said means for storing said comparison data.

23. The method for surveying a track according to claim 19, wherein the first predefined distance at which the first antenna phase center is positioned over the first rail is approximately six to eight feet.

24. The method for surveying a track according to claim 19, wherein the first predefined distance at which the first antenna phase center is positioned over the first rail is at least six feet.

* * * * *